Patented Feb. 15, 1944

2,341,868

UNITED STATES PATENT OFFICE 2,341,868

TREATMENT OF STORAGE ORGANS

Albert E. Hitchcock and Percy W. Zimmerman, Yonkers, N. Y., assignors to Boyce Thompson Institute for Plant Research, Inc., Yonkers, N. Y., a corporation of New York No Drawing. Application September 24, 1942, Serial No. 459,559

8 Claims. (Cl. 47—58)

This invention relates to the treatment of storage organs, such as tubers, bulbs, corms, cormels, roots and the like with a plant hormone capable of retarding or inhibiting their sprouting. The invention aims to provide a method of treating storage organs with an hormone in vapor form and in such intimate and sustained contact with the storage organ that the normal sprouting is effectively inhibited.

It is customary practice to store large quantities of such organs as Irish potatoes, onions, carrots, sweet potatoes, beets and flower bulbs, such as dahlias, tulips, etc. in cellars and other cool places to delay their sprouting. Notwithstanding the low temperatures at which the organs are usually maintained, it is practically impossible to delay sprouting after their natural dormant or rest period has passed. While sprouting may be delayed by the use of artificially cooled storage spaces, this expedient is not economically practicable or adequately effective and, moreover, a rapid and destructive growth starts soon after the organs are removed from storage for resale or use.

This invention aims to provide a simple and economical method of treating organs with an hormone in vaporized form to inhibit the normal sprouting, thereby preserving the organs and eliminating to a large extent the waste we now suffer. We have discovered a number of related aromatic compounds which may be applied in vapor form to storage organs to inhibit the normal sprouting.

Plant hormones which we have found effective in the method of the invention are aromatic compounds which may be described by the formula R—(CH₂)ₙ—R' in which R is a member of the group consisting of:

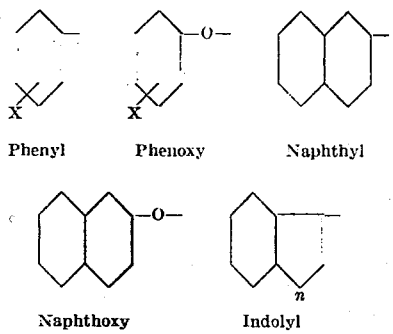

Phenyl   Phenoxy   Naphthyl

Naphthoxy   Indolyl where $n$ is a cardinal number which may have the values 0, 1, 2, or 3. R' is a member of the group consisting of COOH, CONH₂, COOCH₃, COOC₂H₅, and X is a member of the group consisting of hydrogen, halogen, amino and nitro.

Examples of especially effective phenyl compounds are: 2-bromo-3-nitrobenzoic acid and 2,3,5-triiodobenzoic acid and cis-cinnamic acid and their respective amides, methyl esters, and ethyl esters.

Examples of especially effective phenoxy compounds are: Both the dichloro-, and dibromophenoxyacetic acids and their respective amide, methyl ester, and ethyl ester derivatives and their corresponding higher homologs where $n$ is 2 or 3 particularly when the halogens are in the 2.4-positions; both the monochloro-, and monobromophenoxyacetic acids and their respective amide, methyl ester, and ethyl ester derivatives, the halogen substituents being more effective in the para position than in the ortho position; nitrophenoxyacetic acid and its respective amide, amino, methyl ester, and ethyl ester derivatives, particularly when the nitro group is in the meta position; and trichlorophenoxy-ethyl-chloride and tetrachlorophenoxy-ethyl chloride.

Examples of especially effective naphthoxy compounds are: β-naphthoxyacetic acid and its respective amide, methyl ester, and ethyl ester and their higher homologs where $n$ is 2 or 3.

Examples of especially effective naphthalene compounds are: α-naphthaleneacetic acid and its respective amide, methyl ester, and ethyl ester.

Examples of especially effective indole compounds are: β-indoleacetic acid and its respective amide, methyl ester, and ethyl ester derivatives and their higher homologs where $n$ is 2 or 3.

In an advantageous embodiment of the invention, the storage organs are placed in containers or closures and a vapor of the compound is caused to permeate the space surrounding them. The storage organs undergoing treatment are preferably in a confined, but not necessarily sealed, place to prevent an undue dissipation of the hormone vapor and to this end the organs may be treated with the vapor while in cans, boxes, bags, storage rooms, cellars, pits and the like (hereinafter, for simplification, called a "container") while the vapor is acting upon the organs. The organs, in some applications of the invention, are left in a container having the vapor therein, or the vapor may be added to the space from time to time or continuously to produce the effect desired.

In an important aspect of the invention means are provided to maintain low concentrations of the vapors in contact with the storage organs for such periods as are necessary to inhibit the sprouting.

In maintaining a vapor of the compound in contact with the storage organs, we may use a compound in the container which vaporizes slowly at normal atmospheric conditions and permeates the space of the container. Among the substitution products of the compounds described which are especially effective for this method of treatment are the amides and esters. Other compounds which do not vaporize adequately at ordinary atmospheric temperatures include the acids and these may be vaporized by any suitable heating. The invention not only aims to control the amount of evaporation by means of the temperature of the compound but physically to combine the compound with a material which will absorb or adsorb it, suppressing the vaporization and permitting the vapors to be dissipated slowly and in very small amounts over relatively long periods.

In carrying out a method of the invention with tubers, for example Irish potatoes, stored in a cellar or room, or other suitable container, a small amount of an amide or an ester of one of the aforementioned compounds is placed in the container and permitted to evaporate. The vapors become disseminated throughout the space of the container and act upon the tubers retarding their sprouting. In the case of acids or other compounds which do not evaporate easily at normal temperatures, the compound is heated slowly to obtain the desired rate of evaporation. In the larger containers, such as cellars, the air is preferably circulated by a fan to provide a uniformly effective concentration of the vapor in contact with all the tubers.

The rate of vaporization may be regulated when necessary by incorporattion of the compound in a suitable carrier which either increases or retards the vaporization as required. The compound may be mixed with such carriers as talc, bentonite, flour, clay, kaolin, sawdust, carbon, etc., and the mixture applied directly or indirectly to the storage organs. The storage organs may be dusted with the mixture or the container in the case of cans, bags, boxes and the like may be dusted or coated with the mixture. Bodies of the mixture, compressed or loose, may be placed in the container. Depending upon the state of fineness of the mixture and its compactness, the vaporization may be controlled. The material may be one which has a tendency to absorb or adsorb the compound and release it gradually, and the mixture may be ground fine or coarse according to whether vaporization is to be hastened or retarded.

A liquid carrier may also be used to regulate vaporization of the compound. The compound may be dissolved or suspended in the liquid and the liquid applied directly to the storage organ or to the container. Solutions of volatile liquids like alcohol and acetone and one or more of the compounds may be sprayed on the storage organ, or on the container leaving a thin film of the compound. Spreaders and stickers such as Aerosol, Cacein, and Carbowax, etc. may be included in the volatile carriers, or the spreaders and stickers may be used in water containing the compound.

By way of example, we shall explain an application of the method of the invention to the treatment of Irish potatoes with the vapors of methyl esters of naphthaleneacetic acid. It is, of course, understood that the compounds herein described may be similarly used in the treatment of potato tubers and other storage organs. In treating potato tubers with the methyl ester of $\alpha$-naphthalene acetic acid, the dosage may vary considerably. For example, alcohol or acetone solutions of the plant hormone may be applied to a suitable absorbent material such as filter paper, blotting paper, paper towels, etc. After the solvent has evaporated, the papers impregnated with the plant hormone are interspersed with the tubers in the storage container and are left there throughout the desired period of sprout inhibition which is generally from 1–6 months. This adaptation of the method of the invention usually requires relatively large quantities of the hormone, for example, 2,500–10,000 mg. of the methyl ester of $\alpha$-naphthaleneacetic acid per bushel of Irish potatoes, and is dependent upon slow vaporization of the hormone from the start.

In another adaptation of the method, the potatoes are dusted with finely-ground talc (or other suitable carrier) preparations of the hormone and are then placed in a storage container. This method requires about $\frac{1}{4}$ the quantity of hormone used in the foregoing method, that is, from about 600–2,500 mg. of the methyl ester of $\alpha$-naphthaleneacetic acid per bushel of potato tubers.

In still another variation of the method, the plant hormone is vaporized quickly by means of heat and the vapors disseminated in the container, with or without forced circulation of the air in the container. For example, a watch glass containing the hormone, for example, methyl ester of $\alpha$-naphthalene acetic acid, is placed upon an electric hot plate or upon a block of any heat-retaining substance such as iron, porcelain, clay, etc. to vaporize the hormone. This method is very effective since the quantity of the hormone ester (60–240 mg. per bushel of potato tubers) is about $\frac{1}{40}$ of that usually employed in the solution method and about $\frac{1}{5}$ of that usually employed in the carrier method.

It may be stated as a general rule that the plant hormones herein named may be used in quantities varying from 10 to 10,000 mg. per bushel of storage organs, depending upon the kind of organs, the period of delay desired, the method of applying the vapor, the inclusion of other substances, and the temperature of the container. In the case of potato tubers, for example, which are to be stored for six months or longer, the temperature should be uniformly low, preferably not higher than 10° C. For shorter periods of storage, temperatures around 10° C. may also be used, but when the period is not over three months, higher temperatures (e. g. 15°–20° C.) may be used, especially where conditions are such that the amount of shrinkage is not serious. In accordance with the method of the invention, storage organs may be preserved by delaying or inhibiting their sprouting under varying conditions of temperature and moisture, depending upon the particular organs undergoing treatment and the period it is desired to inhibit sprouting.

This application is a continuation-in-part of our application Serial Number 280,806, filed June 23, 1939.

We claim:

1. The method of inhibiting the sprouting of storage organs which comprises subjecting the storage organs to the action of the vapor of a plant hormone having the formula $$R-(CH_2)_n-R'$$

in which R is a member of the group consisting of

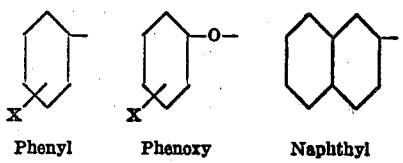

Phenyl  Phenoxy  Naphthyl

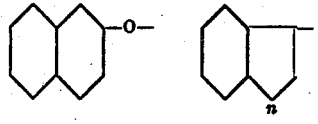

Naphthoxy  Indolyl where $n$ is a cardinal number which may have the values 0, 1, 2, or 3, R' is a member of the group consisting of COOH, CONH$_2$, COOCH$_3$, COOC$_2$H$_5$, and X is a member of the group consisting of hydrogen, halogen, amino and nitro, said plant hormone being provided in such concentration and for such a period that the sprouting of the storage organs are effectively inhibited.

2. In the method of claim 1, treating potato tubers for from one to six months while in a container the temperature of which is maintained below 10° C. the major portion of the time.

3. In the method of claim 1, subjecting storage organs to treatment while in a container for a period up to about three months the temperature of which is maintained below 20° C. the major portion of the time.

4. In the method of claim 1, subjecting storage organs in a container to the action of the plant hormone and providing such control over the temperature and humidity that the storage organs do not suffer appreciable shrinkage.

5. The method of inhibiting the sprouting of storage organs which comprises treating storage organs while stored in a container with the vapor of a plant hormone having the formula $$R-(CH_2)_n-R'$$

in which R is a member of the group consisting of

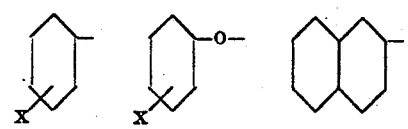

Phenyl  Phenoxy  Naphthyl

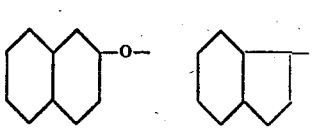

Naphthoxy  Indolyl where $n$ is a cardinal number which may have the values 0, 1, 2, or 3, R' is a member of the group consisting of COOH, CONH$_2$, COOCH$_3$, COOC$_2$H$_5$, and X is a member of the group consisting of hydrogen, halogen, amino and nitro.

6. In the method of claim 5 applying the plant hormone to a material capable of absorbing the hormone and interspersing the material through a mass of the storage organs.

7. In the method of claim 5 incorporating the plant hormone in a finely divided solid material having the capacity of absorbing the plant hormone and placing the solid material in such close contact with the storage organs that the vapors of the plant hormone are disseminated slowly into the space surrounding the storage organs.

8. In the method of claim 5 dissolving the plant hormone in a readily volatile solvent and applying the resulting solution to an absorbent material, permitting the solvent to evaporate and placing the absorbent material in close proximity to the storage organs.

ALBERT E. HITCHCOCK.
PERCY W. ZIMMERMAN.